July 30, 1968  H. HANSSON  3,394,719
CAMPING APPARATUS

Filed July 25, 1966  3 Sheets-Sheet 1

HARRY HANSSON
INVENTOR.

BY
Norman S. Blodgett

July 30, 1968     H. HANSSON     3,394,719
CAMPING APPARATUS

Filed July 25, 1966     3 Sheets-Sheet 2

HARRY HANSSON
INVENTOR.

July 30, 1968  H. HANSSON  3,394,719
CAMPING APPARATUS

Filed July 25, 1966  3 Sheets-Sheet 3

HARRY HANSSON
  INVENTOR.

BY

United States Patent Office 3,394,719
Patented July 30, 1968

3,394,719
CAMPING APPARATUS
Harry Hansson, Pomogussett Road,
Rutland, Mass. 01543
Filed July 25, 1966, Ser. No. 567,417
6 Claims. (Cl. 135—1)

ABSTRACT OF THE DISCLOSURE

This invention relates to a camping apparatus and, more particularly, to an enclosure intended to extend rearwardly from an automobile and, alternatively, to be stored in a container mounted on the automobile.

---

Figure 1:
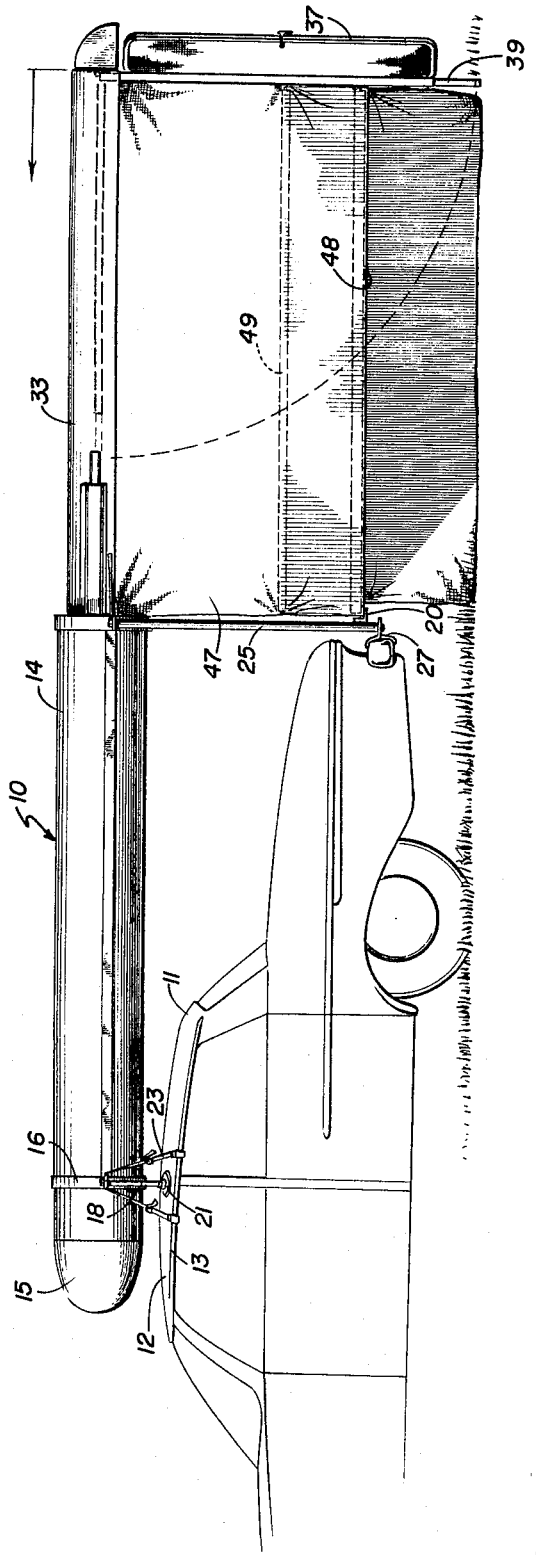

In the past, several systems have been used for camping overnight as one travels about the country in an automobile. One of the most common is the use of a house trailer provided with its own wheels and suspension and trailed behind the automobile. Another method is to use a trailer behind the automobile carrying a tent which is set up in a separate place or, in some cases, having an expandable tent which makes use of the trailer as its base. Any kind of a trailer is difficult and dangerous because of its swaying tendencies, because of its inclination to cause the automobile to swerve, and because it is difficult to maneuver, thus limiting the speed of travel. It also requires a separate registration and must be unhitched from the automobile when one wishes to use the car in ordinary city traffic and in everyday driving. Plain tents which are carried from place to place in a trailer or in the back of the automobile are bulky, uncomfortable, and difficult to set up. They require independent beds which are awkward to handle and they provide very little space for storage. These and other difficulties experienced with the prior art devices have been obviated in a novel manner by the present invention.

It is, therefore, an outstanding object of the invention to provide a camping apparatus which can be carried on an automobile without trailing.

Another object of this invention is the provision of a camping apparatus which is very compact and which may be carried on the top of an automobile.

A further object of the present invention is the provision of a camping apparatus providing beds, storage and shelter, which apparatus stores in a very compact space but which may be left on the automobile during normal driving.

It is another object of the instant invention to provide a camping apparatus which folds into a compact container carried on the roof of the automobile, which container does not detract from the beauty of the automobile and which assures that the camping apparatus is not subjected to the action of rain and weather.

Another object of the invention is the provision of a camping apparatus which is adapted to be carried on the top of an automobile and is streamlined, thus affording a minimum of air flow resistance which would otherwise limit speed of travel and make noise.

It is a further object of the invention to provide a camping apparatus which is simple in construction, inexpensive to manufacture, and capable of a long life of useful service with a minimum of maintenance.

A still further object of this invention is the provision of a camping apparatus which folds into a compact space but which, when unfolded, completely encloses the occupants so that they cannot be attacked by insects.

It is a still further object of the present invention to provide a camping apparatus mountable on the top of an automobile and presents very little air resistance during movement of the automobile.

Another object of the invention is the provision of a camping apparatus which is semi-rigid in nature and yet which folds up into a small space for mounting on an automobile.

Another object of the invention is the provision of a camping apparatus which is semi-rigid in nature, which can be carried on the top of an automobile, and yet may be set up very quickly without tools.

Another object of the invention is the provision of a camping apparatus adapted to be mounted on an automobile, which apparatus is pleasing in appearance, both when stored, during movement of the automobile, or when set up during camping.

With these and other objects in view, as will be apparent to those skilled in the art, the invention resides in the combination of parts set forth in the specification and covered by the claims appended hereto.

Figure 2:
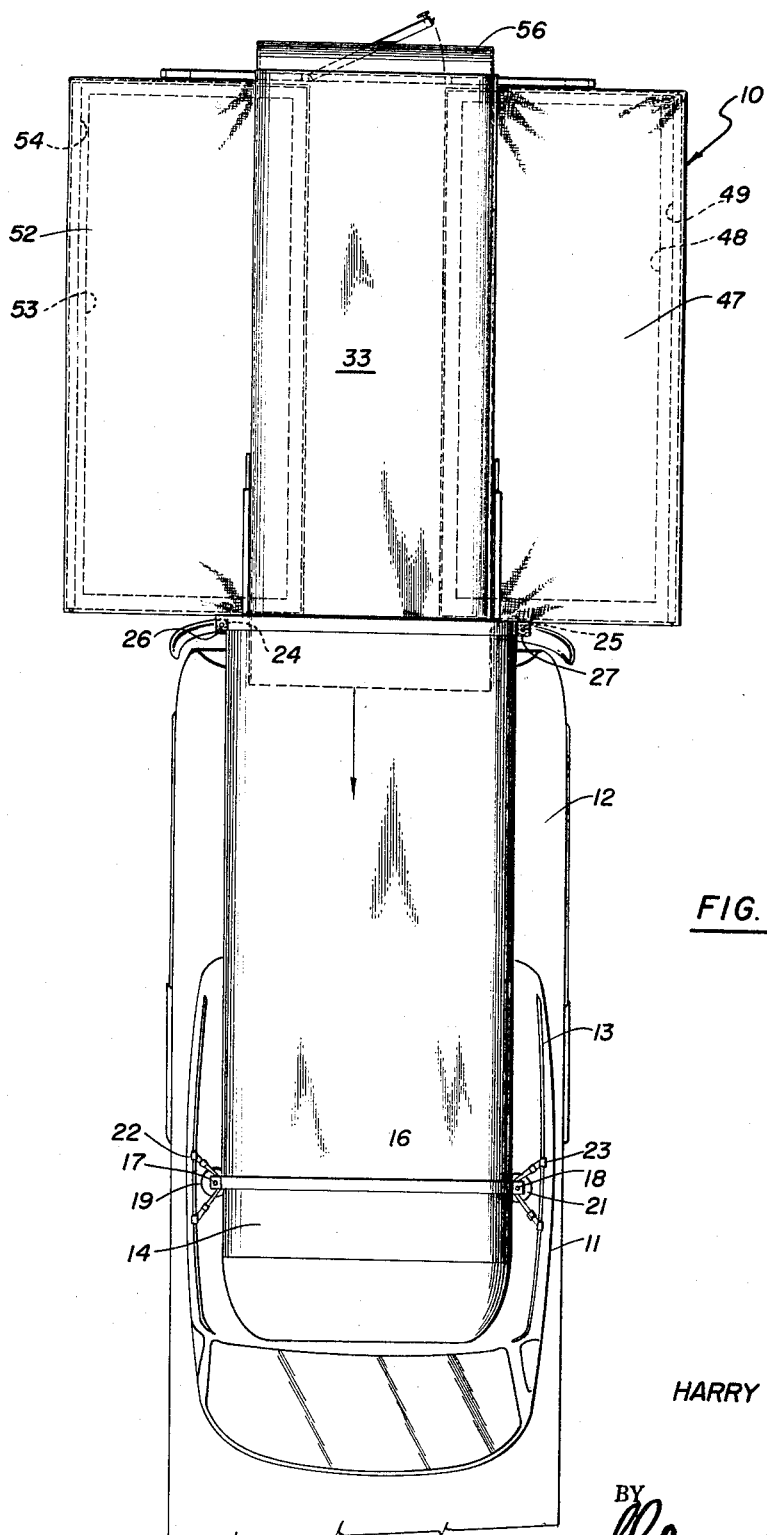
Figure 3:
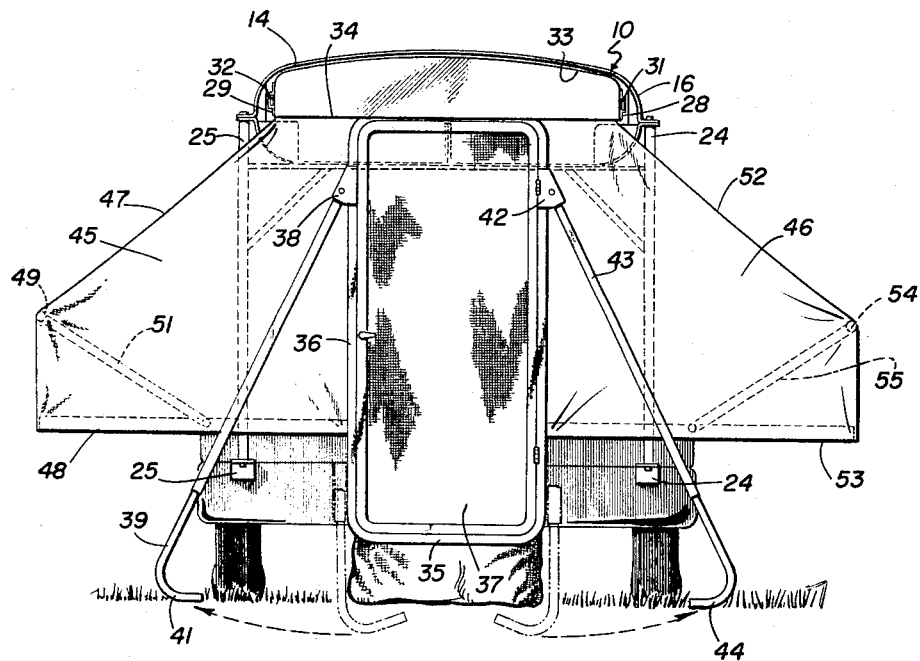
Figure 4:
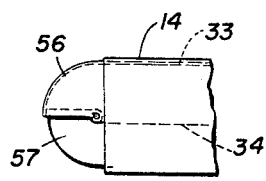
Figure 5:
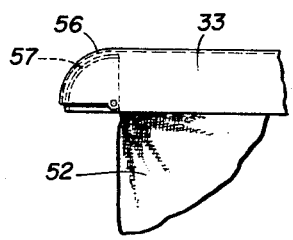

The character of the invention, however, may be best understood by reference to one of its structural forms as illustrated by the accompanying drawings, in which:

FIG. 1 is a side elevational view of a camping apparatus embodying the principles of the present invention, FIG. 2 is a plan view of the apparatus, FIG. 3 is a rear and elevational view of the apparatus, FIGS. 4 and 5 are side elevational views of a portion of the apparatus, shown in two conditions.

Referring first to FIG. 1, wherein are best shown the general features of the invention, the camping apparatus, indicated generally by the refernce numeral 10, is shown in use with an automobile 11. The automobile is provided with a metal roof 12 along the outer periphery of which extends a rain gutter 13. Mounted on the roof is an enclosure 14 whose forward end is provided with a streamlined nose 15. The enclosure is rectangular in plan view, as is evident in FIG. 2, has a width somewhat less than the width of the automobile, and a length which extends from the vicinity of the windshield of the automobile to above the rear bumper. Extending around the upper part of the enclosure 14 at the forward portion thereof (adjacent the nose 15) is a strap 16 whose ends are attached to vertical posts 17 and 18 to the bottom bottom ends of which are attached suction cups 19 and 21, repectively. These suction cups contact and hold the apparatus on the surface of the roof of the automobile. Also connected to the ends of the strap 16 are clamps 22 and 23 which engage the rain gutter 13 to hold the enclosure 14 in place. These clamps consist of flexible straps at the end of which are provided claws which hook under the rain gutter, the straps having buckles to arrange for adjustment to allow them to be pulled tightly to hold the enclosure in place. At the rear corners of the enclosure 14 are provided vertical posts 24 and 25 which are provided at their lower ends with clamps 46 and 47, respectively, which grasp the bumper of the automobile 11.

As is evident in FIG. 3, the enclosure 14 is somewhat oval shaped; more specifically, it is the shape formed by two semi-circles facing toward one another spaced a considerable distance apart and having their bottom corresponding ends joined by a straight line and their other corresponding ends joined by an upwardly-curved line. In any case, the enclosure may be considered as being divided into an upper and a lower portion by an imaginary horizontal line passing centrally thereof. Generally speaking, the upper portion is intended to receive the shelter proper, while the lower portion is used for storage. The mid points of the sides of the enclosure are provided with longitudinal tracks 28 and 29 adapted to receive support wheels 31 and 32, respectively, mounted on the sides of a roof 33. This roof is shaped with a downwardly directed concavity and storage fits inside of and conforms to the general shape of the inside surface of the upper portion of the enclosure 14. The entire enclosure 14 and the roof 33 are made of light sheet metal, such as aluminum or magnesium. Extending between the tracks 28 and 29 and serving to divide the enclosure into its upper and lower portions is a divider 34 formed of sheet metal.

Extending downwardly from the rearward end of the roof 33 is a rear frame 35 carrying a generally rectangular door frame 36 to which is hinged a screen door 37. The door frame 36 is hingedly attached to the roof 33 so that the entire rear frame 35 may be swung up inside of the roof, on occasion, for storage. Extending from one side of the door frame 36 is a bracket 38 to which is hingedly attached for lateral swinging motion a telescopingly-adjustable leg 39 having at its lower end an inwardly-directed foot 41. From the other side of the door frame 36 extends a bracket 42 to which is hingedly attached an adjustable leg 43 having a foot 44. Fastened to the rear frame is a left rear panel 45 having an upper horizontal edge which is attached during setup to the roof 33, an inner vertical edge attached to the left-hand side of the door frame, the bottom horizontal edge which is permanently attached to a cot, as will be described later, an outer vertical edge, and an inclined outer edge adapted to be attached by a zipper, or similar attaching means, to a side panel. The peak panel is formed of a fabric, such as canvas, in the usual way. A similar right rear panel 46 has its upper edge adapted to be attached to the roof, a vertical edge attached to the right-hand side of the door frame, a bottom edge permanently attached to a cot, and a vertical and an inclined outer edge to be attached by a zipper to a side panel.

A canvas side panel 47 is permanently attached at its upper edge to the interior of one side of the roof 33. The panel 47 is generally rectangular and has its bottom edge permanently attached to one side of a cot 48. An immediate portion of the side panel is held outwardly to form a vertical panel and an inclined panel by a horizontal rod 49 which is sewed in a hem in the canvas and is held so that it overlies the outer edge of the cot 48 by a brace 51. A similar side panel 52 is generally rectangular, formed of canvas, and is permanently attached at its upper end to the interior of the roof 33. It is also attached at its lower edge to a cot 53 and an intermediate portion of this side panel is held outwardly to provide a vertical panel and an inclined panel by a rod 54 which is held in place by a hem in the canvas and a brace 55. The rearward edge of the side panel 47 is attached by a zipper to the end panel 45, while the rear edge of the other side panel 52 is similarly provided with fastening means (such as a zipper) to permit it to be attached along the outer edges of the right back panel 46.

The cot 48 is provided with a rectangular frame over which is stretched a suitable flexible element, such as a plastic net. The outer edge of the cot is suspended from the roof by means of the side panel 47. The other side of the cot is supported by an engagement with the door frame 35 of the rear frame 34. At its forward end the cot 48 is also supported by a horizontal angle bar 20 (see FIG. 1) extending between the posts 24 and 25 and attached thereto by a hooked engagement. A similar interengagement exists between the cot 53 and the right-hand side of the door frame 35 and post 24. In order to completely enclose the occupants of the shelter, a suitable canvas front panel formed as three vertical sections fastened together by zippers is provided at the forward end. This panel has its upper edge attached by straps or the like to the forward interior portion of the roof 33. Its side edges are fastened by a zipper or the like to the forward edges of the side panels 47 and 52 and its bottom edges permanently attached to the forward ends of the cots 48 and 52. This forward panel may be provided with a screened window, if desired, to permit circulation through this window and through the screen door 37.

This means that, in order to completely enclose the occupants to keep out mosquitoes and the like, it is only necessary to provide a box-like canvas enclosure that is situated in the passageway between the inner edges of the two cots 48 and 52. This enclosure is suitably fastened to the inner edges of the cots and to the end panels. The center section of the front panel can be removed or rolled up into the roof 33 to permit access to the trunk of the automobile.

As is evident in FIGS. 4 and 5, the roof 33 is provided with a visor or cap 56 inside of which is hingedly mounted an inner cap 57, as shown in FIG. 4. When the roof 33 lies within the enclosure 14, the inner cap 57 is moved into its downward position an dlocked in place, the cap 56 and the inner cap 57 forming a streamlined cover for the enclosure and its contents. When the roof 33 is in extended position, as shown in FIG. 5, the inner cap 57 is nestled inside of the cap 56 and locked in that position and the two caps form a rain drip over the top of the door 37.

The operation of the apparatus will now be readily understood, in view of the above description. While the automobile 11 is moving along the highway, the roof 33 lies within the upper part of the enclosure 14. The cap 56 and the inner cap 57 are in place. The enclosure with its nose 15 and the caps 56 and 57 forms a streamlined element which does not inhibit the movement of the automobile as it moves along. Furthermore, its appearance is satisfactory. The enclosure is held securely in place by the downward pressure of the legs 17 and 18 with their suction cups 19 and 21, respectively, on the roof of the automobile and the clamps 22 and 23 holding the enclosure firmly down by the connection to the rain gutter 13. At the rear, the enclosure is supported and held downwardly by the legs 24 and 25 and their clamps 26 and 27 holding them to the bumper of the car. Other articles, such as fishing rods, tools, and the like, are held in the lower part of the enclosure 14 underlying the divider 34.

When the vehicle arrives at a camping area and it is desired to assemble the shelter, it is only necessary to insert the inner cap 57 inside of the cap 56 and lock it in place. The roof 33 is unlatched from the enclosure 14 and is drawn outwardly. This is permited by the smooth running engagement between the tracks 28 and 29 in the enclosure 14 and the wheels 31 and 32 on the roof 33. A stop is provided to limit outward movement of the roof. All of the elements are made of light metal stock and are quite light; the person setting up the apparatus starts at the enclosure and walks outwardly with the outer end of the roof 33 and supports its outer end. He then releases the back frame 35 and it swings downwardly about its hinged connection at the rear of the roof 33 and assumes a vertical position. The legs 49 and 43 are swung laterally and the whole assembly of roof, rear frame, and legs is lowered slightly until the feet 41 and 44 associated with the legs are in contact with the ground. The horizontal angle bar 20 (previously stored in the roof) is placed across the support posts 24 and 25. Next, the cot 53 is released from the roof and is lowered into place. As soon as the side panel 47 has been stretched out, the rear end of the cot is interlocked with the door frame 36 and the leg 39, while the front end rests on the bar 20. Next, the cot 48 is lowered into place and interlocked with the door frame 36, the leg 43, and the bar 20. The rod 49 which lies in a hem in the canvas is automatically swung into place with its brace 51 against the bight of the side panel 47 when the cot is lowered. Similarly, the rod 54 is automatically swung with the brace 55 into place against the intermediate portion of the side panel 52. The side panel 47 is fastened securely by zipper means or the like to the outer edge of the left back panel 45 while the rear edge of the side panel 52 is zippered into place with the outer edge of the right back panel 46. It is only necessary then to raise the front panel and zip it into place with the forward edges of the side panels.

Then, the box-like floor enclosure is fastened in place between the cots and the shelter is complete.

It can be seen from the foregoing description that the present invention provides a camping apparatus which may be readily carried on an automobile without any need for trailing. The apparatus does not need to be registered, it is pleasing in appearance, and it is very rugged and strong in construction. The enclosure, by use of the present invention, does not need to be carried inside of the automobile or to occupy space in the trunk. Nevertheless, the articles carried in the enclosure as well as the living quarters are free of dust and dirt and from rain during traveling. Once the living quarters have been set up, however, the effect is that of a complete tent with beds and suitable provision against the entrance of insects and animals. It is possible to warm the interior, while at the same time in warm weather it can be made cool by permitting circulation of air. The screen door 37 may be covered with canvas or plastic in cold weather as may be the air-admitting window in the front panel. There is no need to remove the enclosure and the camping apparatus while the automobile is being used for normal everyday use, since there is no trailer or other accessory equipment to lengthen the automobile. Therefore, it can be parked in the usual places in the city and the appearance is such that the user can feel free to leave the camping apparatus on the automobile at all times, so that he is ready to go camping at a moment's notice. The normal camping accessories are kept in the bottom section of the enclosure and it is not necessary for him to gather these implements from various parts of the house at the time that a camping trip is contemplated.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A camping apparatus, comprising
  (a) a hollow enclosure adapted to be mounted on an automobile and extend lengthwise thereof,
  (b) a shelter roof slidable from a first position associated with the enclosure to a second position extending rearwardly of the automobile, and
  (c) a shelter wall movable from a stored position within the roof to a functional position hanging from the roof, the shelter walls including two opposed side walls made of canvas, each side wall being connected at its lower end to one side of a rectangular cot, a longitudinal rod and brace being associated with the cot forms each side wall into an inclined upper portion and a vertical lower portion.

2. A camping apparatus as recited in claim 1, wherein shelter walls include a back wall hingedly connected to the rear end of the roof and swingable from the roof into a vertical position wherein the back wall includes two diagonal legs which extend from the roof to the ground to support the back end of the roof, and wherein the back frame is provided with a screen door.

3. A camping apparatus as recited in claim 1, wherein the shelter roof is formed of sheet material and is concaved downwardly, the shelter walls including a back wall which is hinged at its upper end to the back end of the interior of the roof and which swings up into the roof for storage.

4. A camping apparatus as recited in claim 3 wherein the shelter wall includes two side walls each carrying a cot and including a back frame swingable downwardly from the roof to support the roof and means interconnecting the ends of the cots with the back frame and with the said support posts.

5. A camping apparatus as recited in claim 1, wherein the enclosure includes means supporting it on the roof of the automobile at its forward end and clamping it to the rain gutter of the automobile, wherein a pair of posts at the rear end extend vertically downwardly and are provided on their lower ends with clamps for attachment to the rear bumper of the automobile, and wherein the back frame includes a rectangular door frame and means to suspend it from the roof with its lower end a substantial distance from the ground and including two legs hingedly attached to the sides of the door frame and extending diagonally laterally therefrom, and the connections between the cots and the back frame existing between the cots and the door frame.

6. A camping apparatus as recited in claim 1, wherein a horizontal dividing plate extends centrally through the enclosure to divide it into an upper portion in which the shelter roof is stored and a lower portion for storage of other camping articles.

References Cited
UNITED STATES PATENTS

| | | | |
|---|---|---|---|
| 2,533,683 | 12/1950 | Nevhaus | 135—1 |
| 2,718,015 | 9/1955 | Fisk | 135—1 |
| 2,938,525 | 5/1960 | MacKinlay | 135—1 |
| 3,333,594 | 8/1967 | Moss | 135—1 |

REINALDO P. MACHADO, *Primary Examiner.*